Dec. 29, 1936.    F. BROWN    2,065,964
WEIGHING MACHINE
Filed Oct. 18, 1935    5 Sheets-Sheet 1
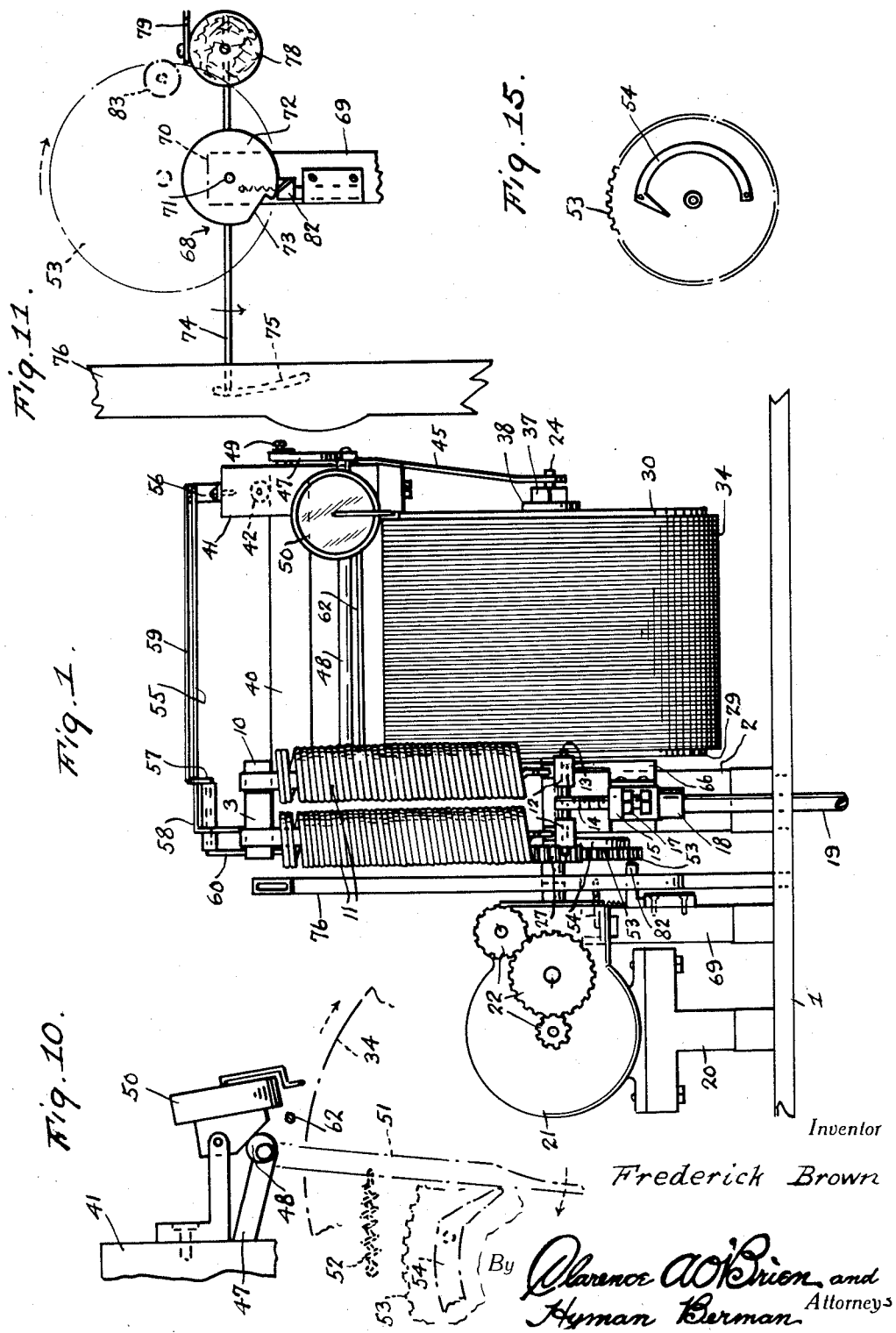
Inventor
Frederick Brown
By Clarence A.O'Brien and
Hyman Berman
Attorneys Dec. 29, 1936.  F. BROWN  2,065,964
WEIGHING MACHINE
Filed Oct. 18, 1935  5 Sheets-Sheet 2
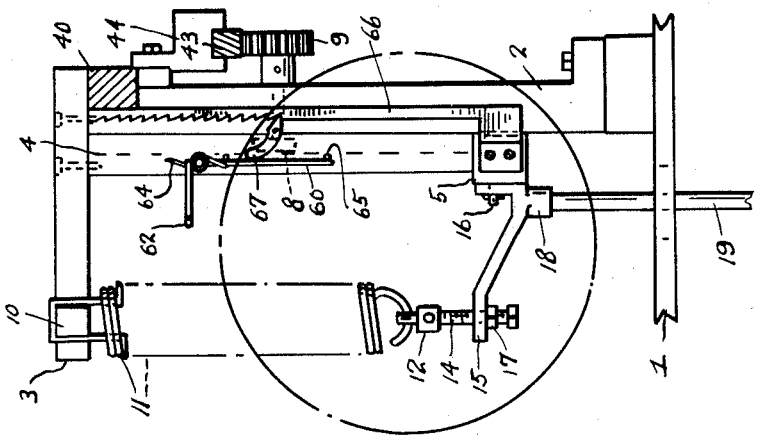
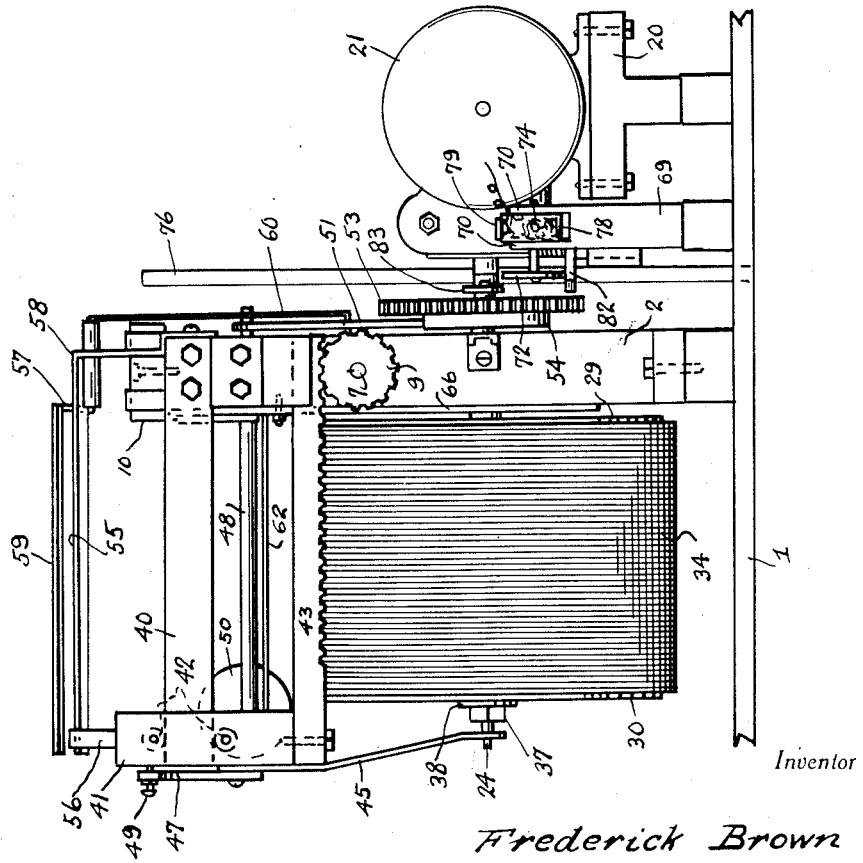
Inventor
Frederick Brown
By Clarence A. O'Brien and
Hyman Berman
Attorney Dec. 29, 1936.   F. BROWN   2,065,964
WEIGHING MACHINE
Filed Oct. 18, 1935   5 Sheets-Sheet 3
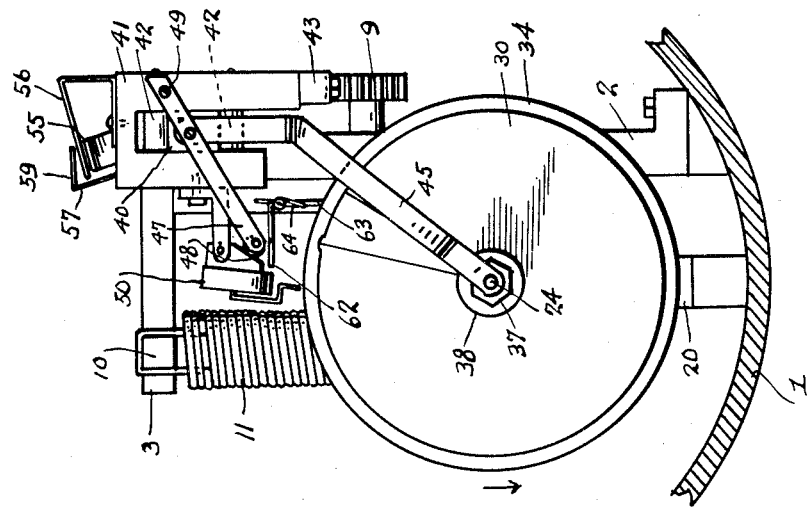
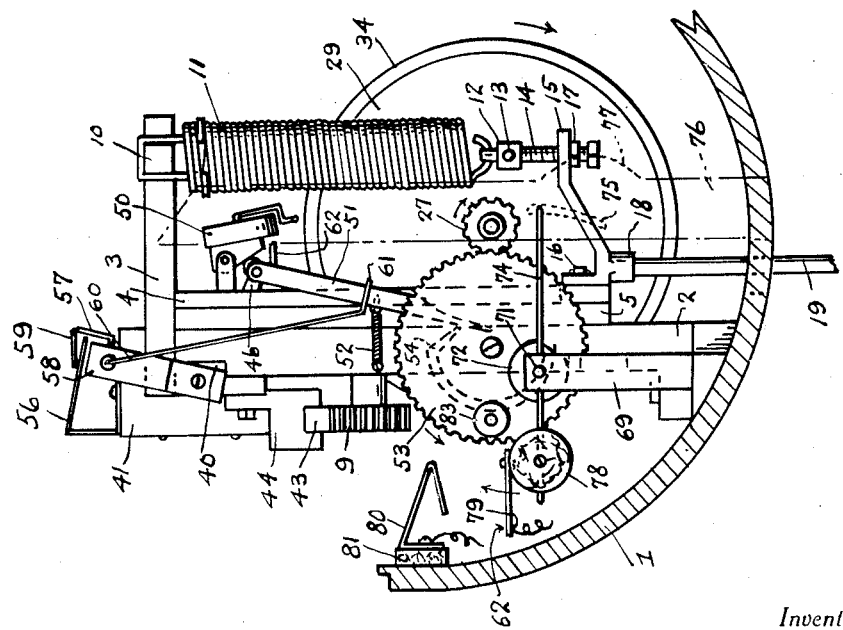
Inventor
Frederick Brown
By Clarence A. O'Brien and
Hyman Berman
Attorneys

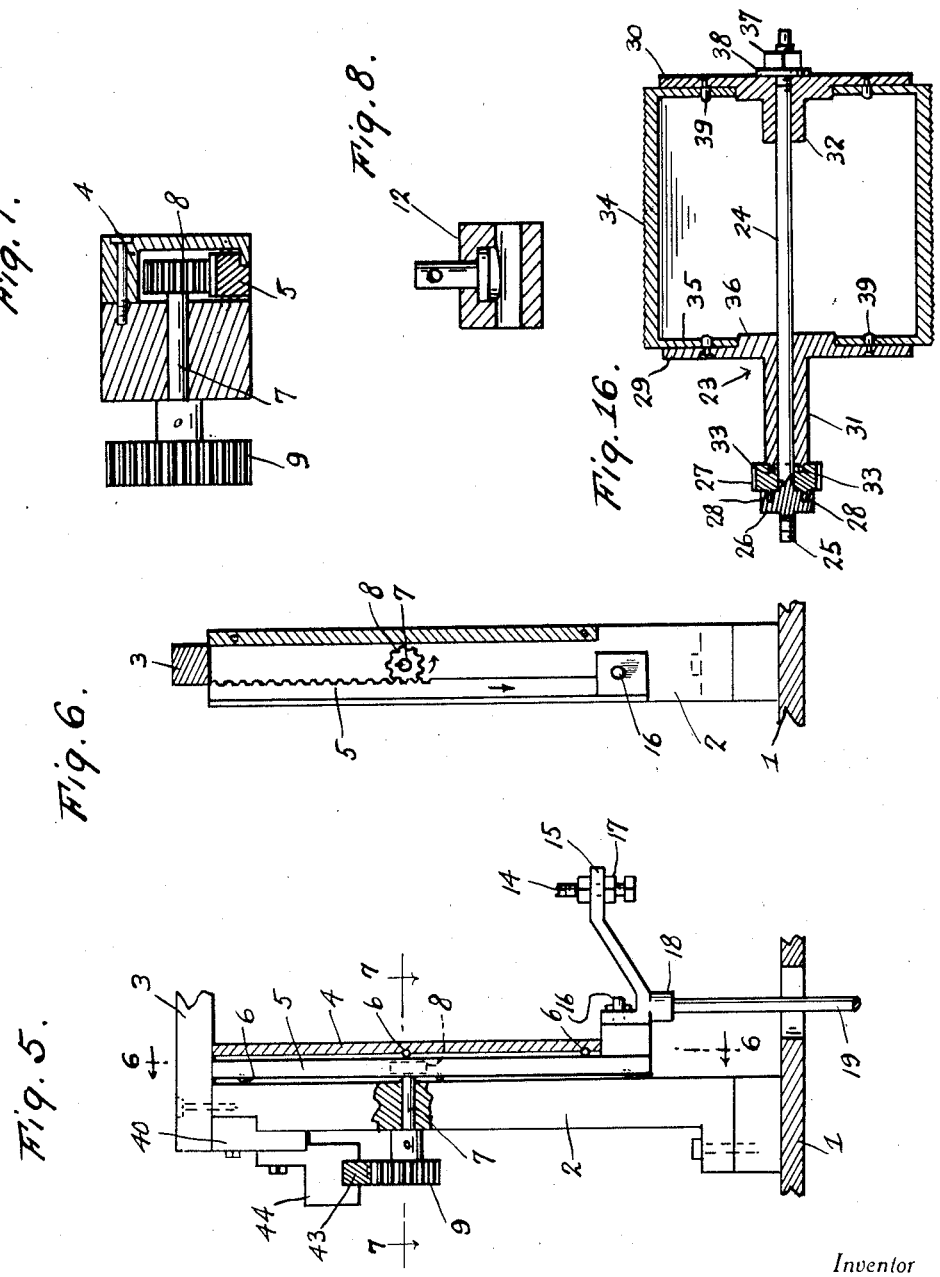

Dec. 29, 1936.  F. BROWN  2,065,964
WEIGHING MACHINE
Filed Oct. 18, 1935  5 Sheets-Sheet 5
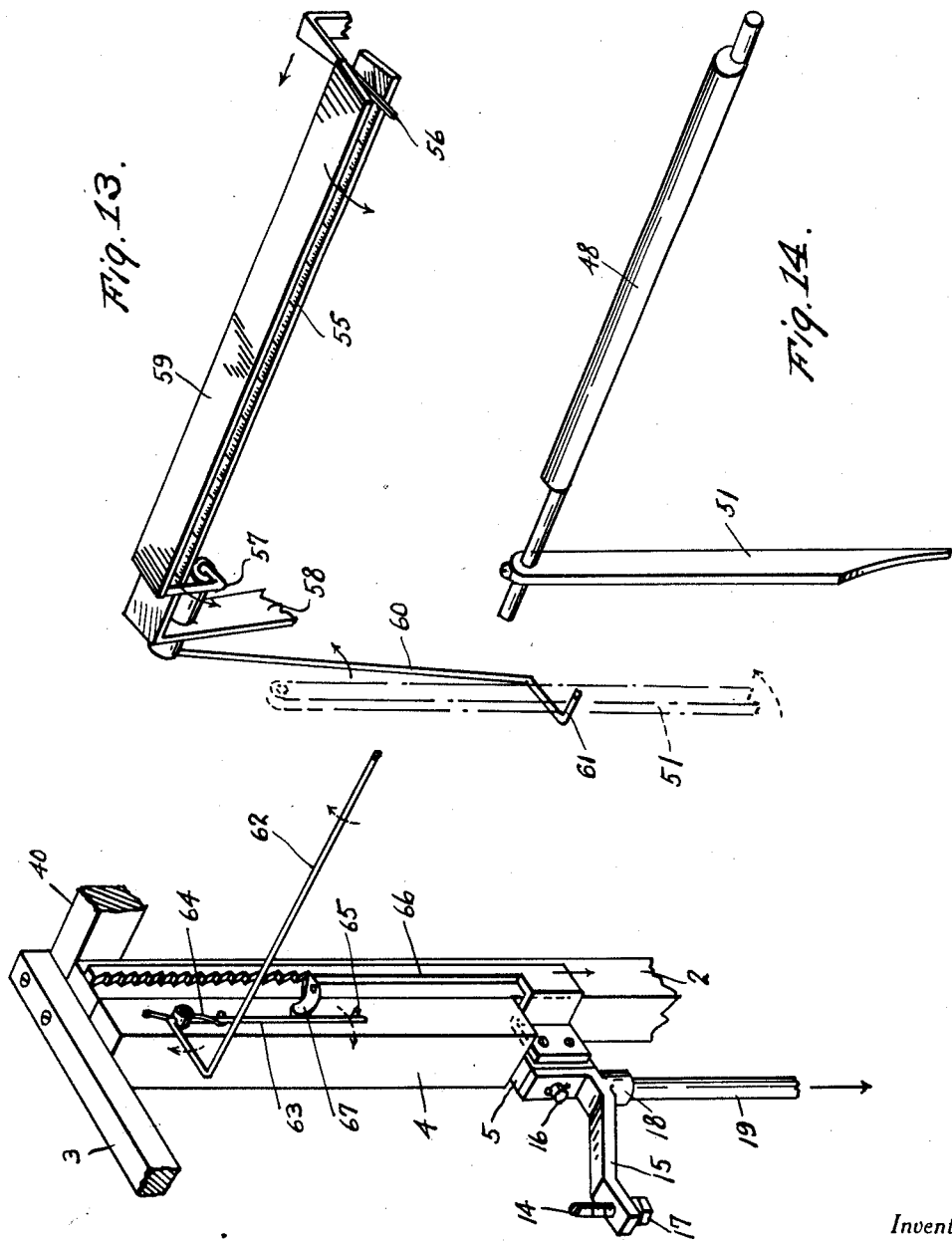
Inventor
Frederick Brown
By Clarence A. O'Brien and Hyman Berman
Attorneys Patented Dec. 29, 1936

2,065,964

UNITED STATES PATENT OFFICE 2,065,964

WEIGHING MACHINE

Frederick Brown, Louisville, Ky., assignor to The Talking Weighing Machine Company, Incorporated, Louisville, Ky., a corporation Application October 18, 1935, Serial No. 45,650

2 Claims. (Cl. 265—27)

The present invention relates to new and useful improvements in weighing machines and has for its primary object to provide, in a manner as hereinafter set forth, an apparatus of this character embodying novel means for audibly indicating the weight of a person standing on the usual platform, upon the insertion of a coin of the proper denomination.

Another important object of the invention is to provide a weighing machine or scale of the aforementioned character which includes visual as well as audible weight indicating means.

Still another very important object of the invention is to provide a weighing machine or scale of the character described including an electric motor driven sound reproducing mechanism, together with novel means for controlling the electric circuit to the motor.

Still another very important object of the invention is to provide, in a weighing machine or scale including a cylindrical record and reproducer operatively engageable therewith, novel means actuated by the usual platform under the weight of a person standing thereon for shifting the reproducer to the correct position relative to the record prior to the engagement of said reproducer with said record.

A still further important object of the invention is to provide a weighing machine or scale of the character set forth which includes a novel construction, combination and arrangement of parts for engaging the reproducer with the record and for disengaging said reproducer from said record.

Other objects of the invention are to provide a weighing machine of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in front elevation of the mechanism constituting the present invention.

Figure 2 is a view in rear elevation thereof.

Figure 3 is a view in elevation looking at one end of the apparatus with the electric motor omitted.

Figure 4 is an elevational view looking at the other end of the apparatus.

Figure 5 is a view partially in side elevation and partially in vertical section of the supporting post and adjacent parts.

Figure 6 is a detail view in vertical section, taken substantially on the line 6—6 of Figure 5.

Figure 7 is a view in horizontal section, taken substantially on the line 7—7 of Figure 5.

Figure 8 is a detail view in vertical section through one of the spring connectors.

Figure 9 is a view in side elevation of a portion of the recorder shifting mechanism, certain parts being shown in cross section.

Figure 10 is a detail view in side elevation of the recorder and the actuating cam shaft therefor, portions of the operating mechanism for said cam shaft being shown in dotted lines.

Figure 11 is a detail view in side elevation of the coin operated switch.

Figure 12 is a fragmentary view in perspective, showing the means for disengaging the recorder from the record under certain conditions.

Figure 13 is a detail view in perspective of the visual weight indicator.

Figure 14 is a detail view in perspective of the recorder actuating cam shaft and its actuating arm or lever.

Figure 15 is a detail view in side elevation of the gear and cam which, respectively, open the motor switch and actuate the reproducer cam shaft.

Figure 16 is a longitudinal sectional view through the mandrel and the cylindrical record mounted thereon.

Referring now to the drawings in detail, it will be seen that the embodiment of the invention which has been illustrated comprises a suitable casing, a portion only of which has been shown and designated by the reference numeral 1. The casing 1 is to be mounted on top of the usual hollow standard or post which rises from a conventional base on which the usual platform is mounted. Rising from the lower portion of the casing 1 is a post 2 on the upper end of which a horizontal arm 3 is fixed. Mounted vertically on the post 2 is a guide 4 in which a rack bar 5 is slidably mounted. Suitable friction reducing rollers or balls 6 may be provided for the rack bar 5. As illustrated to advantage in Figures 5 and 6 of the drawings, a shaft 7 is journaled at an intermediate point in the post 2 and fixed on one end of said shaft 7 is a gear 8 which is in mesh with the rack bar 5. Fixed on the other end portion of the horizontal shaft 7 is a comparatively large gear 9.

On the free end portion of the arm 3 is a crosshead 10 from which a pair of coil springs 11 depend. Swively mounted on the lower ends of the coil springs 11 are blocks 12 (see Figure 8) between which a pin 13 extends. Journaled on the pin 13 between the blocks 12 and depending from said pin is a threaded, headed shank 14. The shank 14 is threaded through one end portion of an angular bar 15, the upturned other end portion of which is connected to the lower end portion of the rack bar 5, as at 16 (see Figure 9). A lock nut 17 is threaded on the shank 14 and is engaged with the bar 15. Depending from the bar 15 is a socket 18 in which the rod 19 from the usual platform (not shown) is threadedly engaged.

Also rising from the lower portion of the casing 1 is a suitable stand 20 on which an electric motor 21 is mounted. Through a train of gears 22 the electric motor drives a mandrel which is designated generally by the reference numeral 23. Referring now to Figure 16 of the drawings, it will be seen that the mandrel 23 includes a shaft 24 having a threaded end portion 25 for detachable connection with the electric motor. A flange 26 is also provided on this end portion of the shaft 24 and abutting said flange is a gear 27. The flange 26 is provided with sockets for the reception of pins 28 which project from one side of the gear 27. The gear 27 is slidable on the shaft 24. Also slidable on the shaft 24 are disks 29 and 30 having elongated hub portions 31 and 32, respectively, through which the shaft 24 passes. Pins 33 project from one end of the elongated hub 31 and are engaged in sockets which are provided therefor in the opposed side of the gear 27.

Mounted on the mandrel 23 is a removable record 34 which is of substantially hollow, cylindrical form. The ends 35 of the record 34 abut the opposed faces of the disks 29 and 30 and said ends have formed therein centrally located circular openings for the reception of the thickened central portions 36 of said disks 29 and 30. A nut 37 is threaded on the free end portion of the shaft 24 for securing the elements constituting the mandrel 23 in assembled relation with the cylindrical record 34 in position thereon, a washer 38 being interposed between said nut 37 and the disk 30. Suitable means, as at 39, is provided on the disks 29 and 30 for positively securing the record 34 against movement relative thereto and in the correct predetermined position.

Also rigidly fixed on the upper end portion of the post 2 and projecting horizontally therefrom at right angles to the arm 3 is a track 40 on which a carriage 41 travels. The carriage 41 is substantially U-shaped and includes rollers 42 engaged with the top and bottom of the track 40. Rigidly secured to the lower end of the carriage 41 is a rack bar 43 which parallels the track 40 and which is in mesh with the gear 9. The rack bar 43 is slidable in a guide 44 which is mounted above the gear 9. The outer end portion of the shaft 24 of the mandrel 23 is journaled in the lower end portion of a hanger 45 which is mounted on the free end of the track 40.

Inclined arms 46 and 47 (see Figures 3 and 4) are adjustably mounted on the guide 4 and the free end of the track 40, respectively, and journaled thereon is a cam shaft 48. An adjustable stop screw 49 is threadedly mounted in one end portion of the arm 47 for engagement by the carriage 41. Hingedly mounted on the carriage 41 is a reproducer 50 which is operatively engageable with the record 34 and which is adapted to be swung upwardly to inoperative position by the cam shaft 48. A depending lever 51 is fixed on one end portion of the cam shaft 48. A spring 52 is connected to the lever 51 for actuating the cam shaft 48 in a direction to lower the reproducer 50. Rotatably mounted at an intermediate point on the post 2 is a comparatively large gear 53 which is driven by the gear 27. The gear 53 is spaced from the post 2 and mounted on the side thereof which is adjacent said post is a cam 54 which is operatively engageable with the lower end portion of the lever 51. The cam 54 is adapted to actuate the cam shaft 48 against the tension of the spring 52 in a direction to raise the reproducer 50.

Paralleling the track 40 is a scale 55 beneath which the carriage 41 travels. A pointer 56 is mounted on the carriage 41 and is cooperable with the scale 55. An angular rod or shaft 57 is journaled, at an intermediate point, in the supporting arm 58 of the scale 55 and mounted on said rod or shaft is a shutter 59 which is adapted to conceal said scale 55. Of course, the casing 1 is to be provided with a suitable window (not shown) through which the scale 55 may be observed when the shutter 59 is in retracted or inoperative position. One end portion of the rod or shaft 57 is in the form of an arm 60 which terminates, at its free end, in a hook 61 which is engaged with the lever 51.

Journaled for swinging movement on an upper portion of the guide 4 is what may be referred to as a supplemental reproducer elevator 62 (see Figure 12) which includes an arm 63. A spring 64 yieldingly urges the elevator 62 toward inoperative or lowered position. A stop pin 65 limits the movement of the arm 63 under impulsion by the spring 64. Mounted on the lower end portion of the rack bar 5 and rising therefrom adjacent the post 2 is a ratchet bar 66 which is adapted to actuate a pivotally mounted cam 67 which is operatively engaged with the arm 63 for actuating the elevator 62 against the tension of the spring 64. One end portion of the pivoted cam 67 is in the form of a pawl or dog which is engageable with the teeth of the ratchet bar 66.

The electric current to the motor 21 is controlled by a switch which is designated generally by the reference numeral 68. The switch 68 comprises a standard 69 which rises from the lower portion of the casing 1 and which terminates, at its upper end, in upstanding bifurcations 70 in which a horizontal shaft 71 is journaled. Fixed on one end portion of the shaft 71 is a disk 72 having a notch or recess 73 in its periphery. Fixed at an intermediate point on the shaft 71 between the bifurcations 70, is a lever 74 which includes a substantially right angularly extending end portion projecting through an arcuate slot 75 into a coin chute 76. The chute 76 includes a lateral bulge or enlargement 77 which permits the coins to continue their descent after engaging and actuating the lever 74. Adjustably mounted on the other end portion of the lever 74 is a counterweight 78. The counterweight 78 is of insulating material and mounted thereon is a resilient contact 79. The contact 79 is engageable with a resilient, stationary contact 80 (see Figure 3) which is mounted on the casing 1, and insulated therefrom, as at 81. The notch 73 in the disk 72 is for the reception of a spring actuated detent 82 which is slidably mounted on the standard 69

(see Figure 11) for releasably locking the control switch 68 in closed position. The detent 82 projects beyond the disk 72 for engagement and actuation by a protuberance 83 which is mounted on the adjacent side of the gear 53.

Briefly, the operation of the machine is substantially as follows:—

The carriage 41 is normally in the position shown to advantage in Figure 2 of the drawings on the free end portion of the track 40 and the reproducer 50 is in raised or inoperative position. When the person being weighed steps on the usual platform of the scale, the rack bar 5 is moved downwardly by the rod 19 against the tension of the springs 11 for shifting the carriage 41 on the track 40 through the medium of the gears 8 and 9, the rack bar 43, etc., for bringing the reproducer 50 to the correct position relative to the record 34. The record 34 is provided with a series of closely adjacent but uncommunicating circumferential sound grooves for the reception of the stylus of the reproducer 50. A coin of the proper denomination is then deposited in the chute 76 and said coin actuates the switch 68 to closed position, thereby energizing the electric motor 21. When the lever 74 of the switch 68 is actuated by the falling coin, the disk 72 is rotated to bring the notch 73 to a position where the detent 82 can seat or engage therein, thereby locking said switch in closed position. When the motor 21 is energized the mandrel 23, with the record 34 thereon, begins to rotate. Rotation of the mandrel 23 actuates the gear 53 through the comparatively small gear 27 and the cam 54 moves away from and then out of engagement with the lever 51 thereby permitting the spring 52 to actuate the cam shaft 48 in a direction to lower the reproducer 50 into engagement with the record 34. It may be well to here state that the construction and arrangement is such that the record 34 is allowed to attain its maximum speed of rotation before the stylus of the reproducer 50 is engaged therewith. When the stylus of the reproducer 50 engages the record 34 the desired statement is reproduced such, for example, as "You weigh 153 pounds" or "You weigh 162½ pounds", the statement in each groove of the record being repeated one or more times. Then, as the gear 53 continues to rotate the cam 54 thereon again engages the lever 51 and actuates the cam shaft 48 against the tension of the spring 52 for raising the reproducer 50 out of engagement with the record 34. Also, the protuberance 83 on the gear 53 strikes and disengages the detent 82 from the notch 73 thereby releasing the disk 72 and permitting the counterweight 78 to swing the contact 79 downwardly out of engagement with the contact 80 for de-energizing the electric motor 21.

When the spring 52 actuates the lever 51 for lowering the reproducer 50 the shutter 59 swings by gravity to inoperative position for exposing the scale 55 and pointer 56, the arm 60 following said lever 51. Of course, when the carriage 41 is shifted on the track 40 the pointer 56 is moved to indicating position relative to the scale 55 for visually indicating the weight of the person on the platform. When the cam 54 actuates the lever 51 for elevating the reproducer 50 the arm 60 is actuated by said lever for returning the shutter 59 to operative position over the scale 55.

When the person who has been weighed steps from the platform the springs 11 return the carriage 41, with the reproducer 50 thereon, to their former position. The machine is then ready for the next operation. When the ratchet bar 66 moves downwardly with the rack bar 5, the dog 67 rides freely over the teeth of said ratchet bar. Now, should the person being weighed step from the platform before the completion of the hereinbefore described operation, the cam 67 will be actuated by the now downwardly moving ratchet bar 66 in a manner to actuate the arm 63 against the tension of the spring 64, thereby swinging the elevator 62 upwardly for lifting the reproducer 50 out of engagement with the record 34.

It is believed that the many advantages of a weighing machine constructed in accordance with the present invention will be readily understood, and although a preferred embodiment of the apparatus is as illustrated and described, it is to be understood that changes in the details of construction and in the combination and arrangement of parts may be resorted to which will fall within the scope of the invention as claimed.

What is claimed is:—

1. A weighing machine comprising an electric motor, a mandrel for supporting a record, operatively connected to said motor for actuation thereby, a supporting structure, a carriage slidably mounted on said supporting structure, a reproducer pivotally mounted on said carriage and operatively engageable with the record, manually operable spring controlled means for shifting the carriage and the reproducer relative to the record, means operable by the motor for engaging the reproducer with and for disengaging said reproducer from the record, a scale mounted on the supporting structure, a pointer mounted on the carriage and cooperable with said scale, a shutter for concealing the scale, and means operatively connecting said shutter to the electric motor for actuation to operative position thereby.

2. A weighing machine of the class described comprising, in combination, an electric motor, a mandrel, for supporting a record, operatively connected to said motor for actuation thereby, a coin controlled switch for controlling an electric circuit to the motor, a supporting structure, a carriage slidably mounted on said supporting structure, a reproducer pivotally mounted on the carriage and operatively engageable with the record, spring controlled manually operable means for shifting the carriage and the reproducer relative to the record, means operable by the motor for engaging the reproducer with and for disengaging said reproducer from the record and for opening the switch, means operable by said manually operable means for disengaging the reproducer from the record, a scale mounted on the supporting structure, a pointer mounted on the carriage and cooperable with said scale, a shutter mounted for swinging movement on the supporting structure for concealing the scale, said shutter being actuated by gravity to inoperative position, and means operatively connecting the shutter to the motor for actuation thereby to operative position.

FREDERICK BROWN.